(12) United States Patent
Valencia et al.

(10) Patent No.: US 11,313,277 B2
(45) Date of Patent: Apr. 26, 2022

(54) AUXILIARY POWER UNIT PLENUM WITH A PLEATED SCREEN FOR FOREIGN OBJECT DAMAGE PREVENTION

(71) Applicant: The Boeing Company, Chicago, IL (US)

(72) Inventors: Juan F. Valencia, Long Beach, CA (US); Curtis A. Beard, Long Beach, CA (US); Robert W. Snyder, Rancho Cucamonga, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/894,570

(22) Filed: Jun. 5, 2020

(65) Prior Publication Data

US 2021/0381434 A1  Dec. 9, 2021

(51) Int. Cl.
*F02C 7/055* (2006.01)

(52) U.S. Cl.
CPC ........ *F02C 7/055* (2013.01); *F05D 2220/323* (2013.01); *F05D 2220/50* (2013.01)

(58) Field of Classification Search
CPC .. F02C 7/055; F02C 7/05; F02C 7/047; F05D 2220/50
See application file for complete search history.

(56) References Cited

U.S. PATENT DOCUMENTS

| 10,036,320 | B2 * | 7/2018 | Aubert ................... B64C 27/06 |
| 2005/0229558 | A1 * | 10/2005 | Stelzer .................. B64D 33/02 |
| | | | 55/385.3 |
| 2010/0107576 | A1 * | 5/2010 | Belyew ................ B01D 46/523 |
| | | | 55/306 |
| 2018/0156334 | A1 * | 6/2018 | Takeuchi ............... F16J 15/065 |
| 2019/0246624 | A1 * | 8/2019 | Venugopalsetty ...... F02C 7/055 |

* cited by examiner

*Primary Examiner* — Steven M Sutherland
(74) *Attorney, Agent, or Firm* — Felix L. Fischer (57) ABSTRACT

A plenum duct for an auxiliary power unit includes a main body having an inlet aperture and a flow cavity. A pair of screen supports are coupled to the main body proximate a periphery of the inlet aperture, said screen supports extending into the flow cavity. A pleated screen is disposed on the pair of screen supports.

20 Claims, 12 Drawing Sheets

AUXILIARY POWER UNIT PLENUM WITH A PLEATED SCREEN FOR FOREIGN OBJECT DAMAGE PREVENTION

BACKGROUND

Field

The present disclosure relates to plenum for an auxiliary power unit of an aircraft. More particularly, the present disclosure is directed towards a duct incorporating the plenum and having an inlet with a pleated screen within the duct to prevent ingestion of foreign object debris.

Related Art

An aircraft may include an auxiliary power unit (APU), which serves as an additional energy source for starting a main engine. The APU may also provide the power required to operate onboard lighting, galley electrics, and cockpit avionics while the aircraft is parked at the gate. The APU is typically a gas turbine mounted in a compartment located within the tail cone of the aircraft.

A duct with an inlet and a plenum to receive inlet air for the turbine and a compressor in the APU is typically incorporated in the aircraft as a portion of the APU. The inlet may provide an ingestion point for foreign object debris (FOD) which may cause damage to the compressor or turbine. Current APU plenums employ a cylindrical or annular screen surrounding the turbine and compressor inlets. This configuration may create high pressure differential across the screen and potentially uneven sections of pressure around the FOD screen going into the compressor inlet. Proximity of the FOD screen to the compressor inlet may also limit the recovery of airflow swirls after crossing the screen boundary. The configuration additionally limits access to the FOD screen for inspection and servicing and may require teardown of the duct for screen removal. Protection of the plenum from FOD without the present limitations is therefore desirable.

SUMMARY

The implementations disclosed herein provide a plenum duct for an auxiliary power unit. The plenum duct includes a main body having an inlet aperture and a flow cavity. A pair of screen supports are coupled to the main body proximate a periphery of the inlet aperture, the screen supports extending into the flow cavity. A pleated screen is disposed on the pair of screen supports.

A method for screening foreign objects in an auxiliary power unit is enabled by the disclosed implementations. A pleated screen having a first array of openings is inserted in a flow cavity of a plenum duct main body adjacent an inlet aperture. Lateral edges of the pleated screen are engaged on screen supports coupled to the main body proximate a periphery of the inlet aperture with the screen supports extending into the flow cavity.

The features, functions, and advantages that have been discussed may be achieved independently in various implementations or may be combined in other implementations further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure relates to an APU plenum in an aircraft, where the plenum provides inlet air for a load compressor and a gas turbine engine in the APU. A plenum duct defines an inlet aperture and a flow cavity in fluid communication with the inlet to the compressor. A pleated screen is supported within the plenum duct proximate to the inlet aperture and distal from the compressor inlet. The pleated screen is removable laterally through an access door in the duct.

Figure 1:
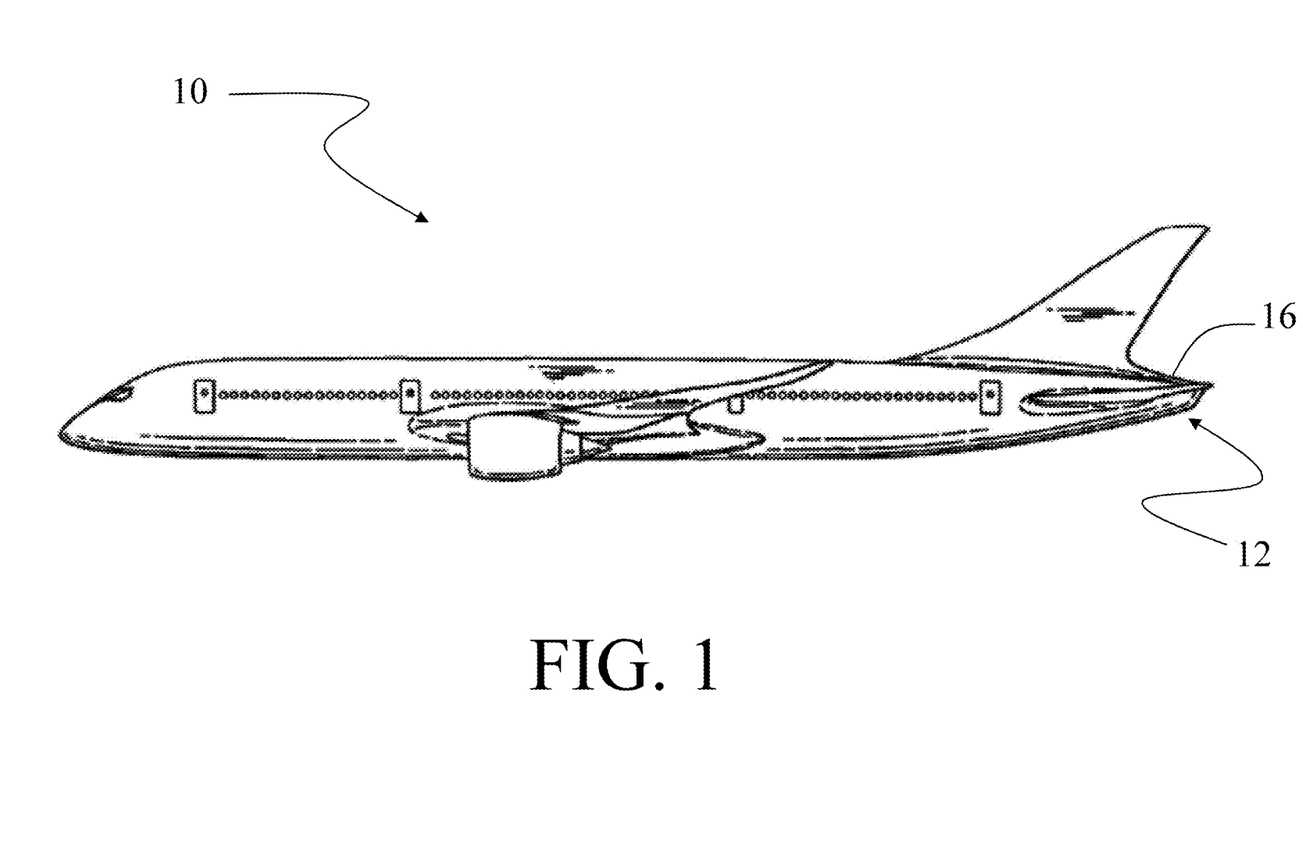
FIG. 1 is a representation of an aircraft having a tail cone housing an APU.
Figure 2:
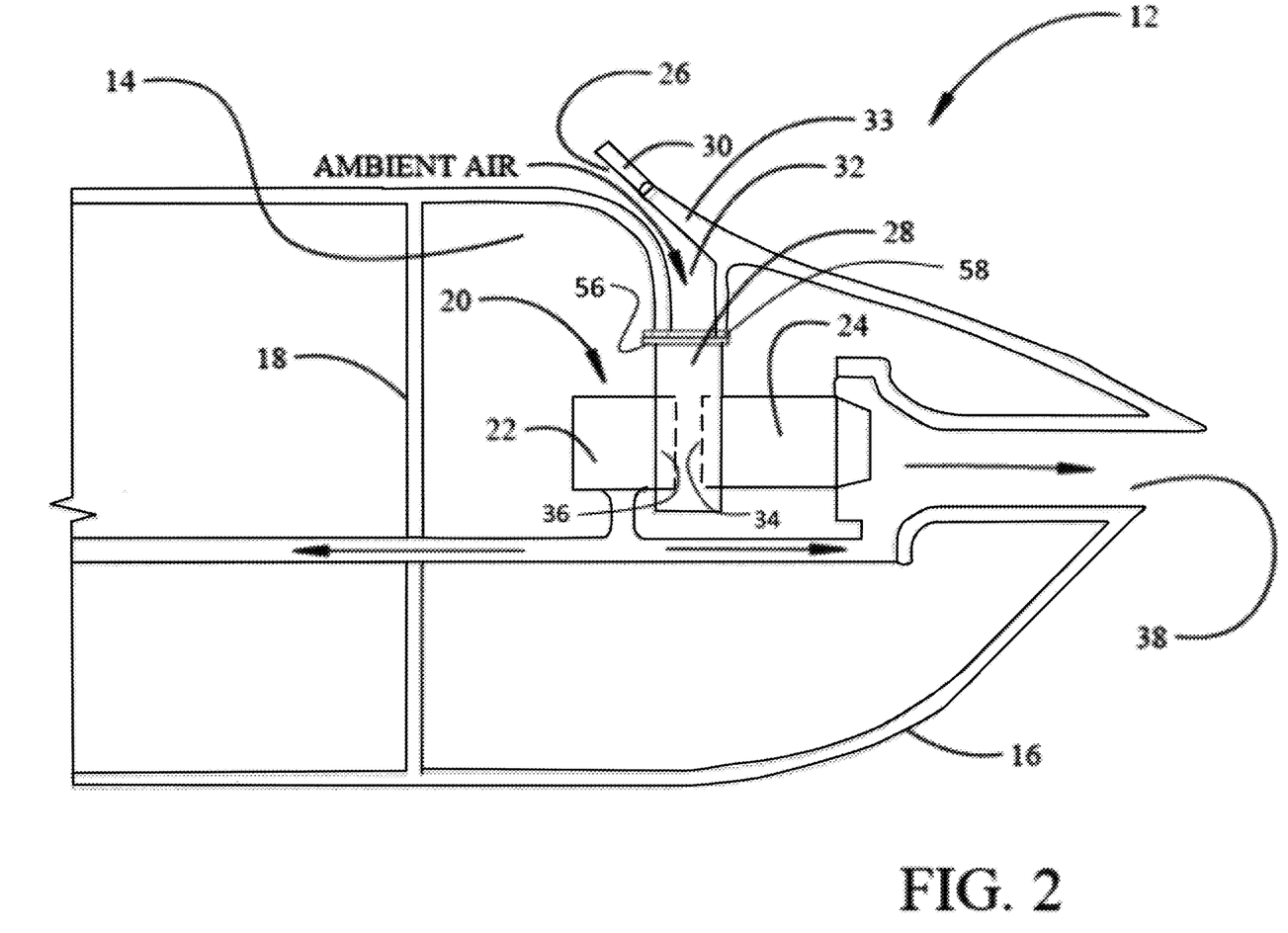
FIG. 2 is a schematic representation of the aircraft tail cone with the APU.
Figure 3A:
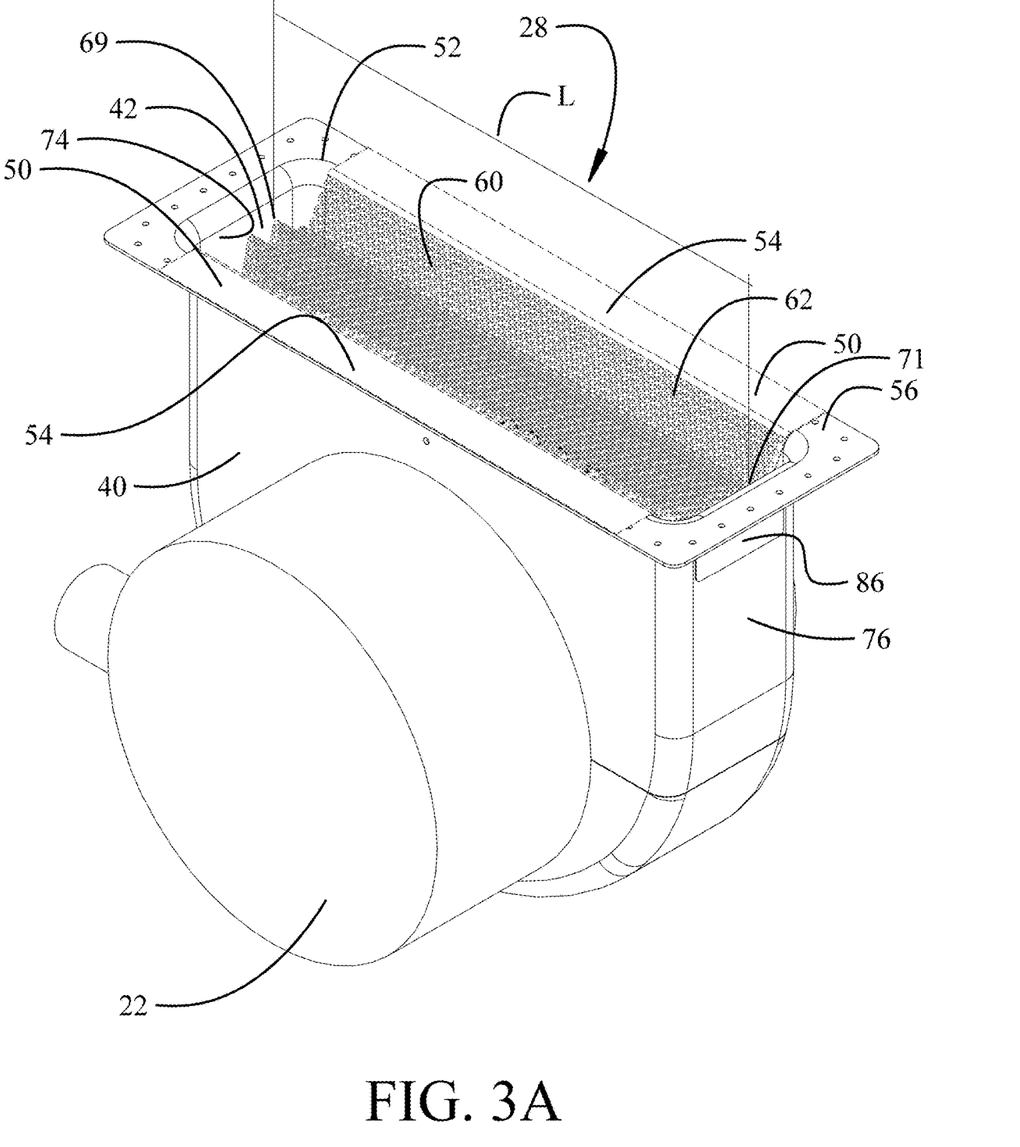
FIG. 3A is pictorial representation of an exemplary implementation of the plenum duct.
Figure 3B:
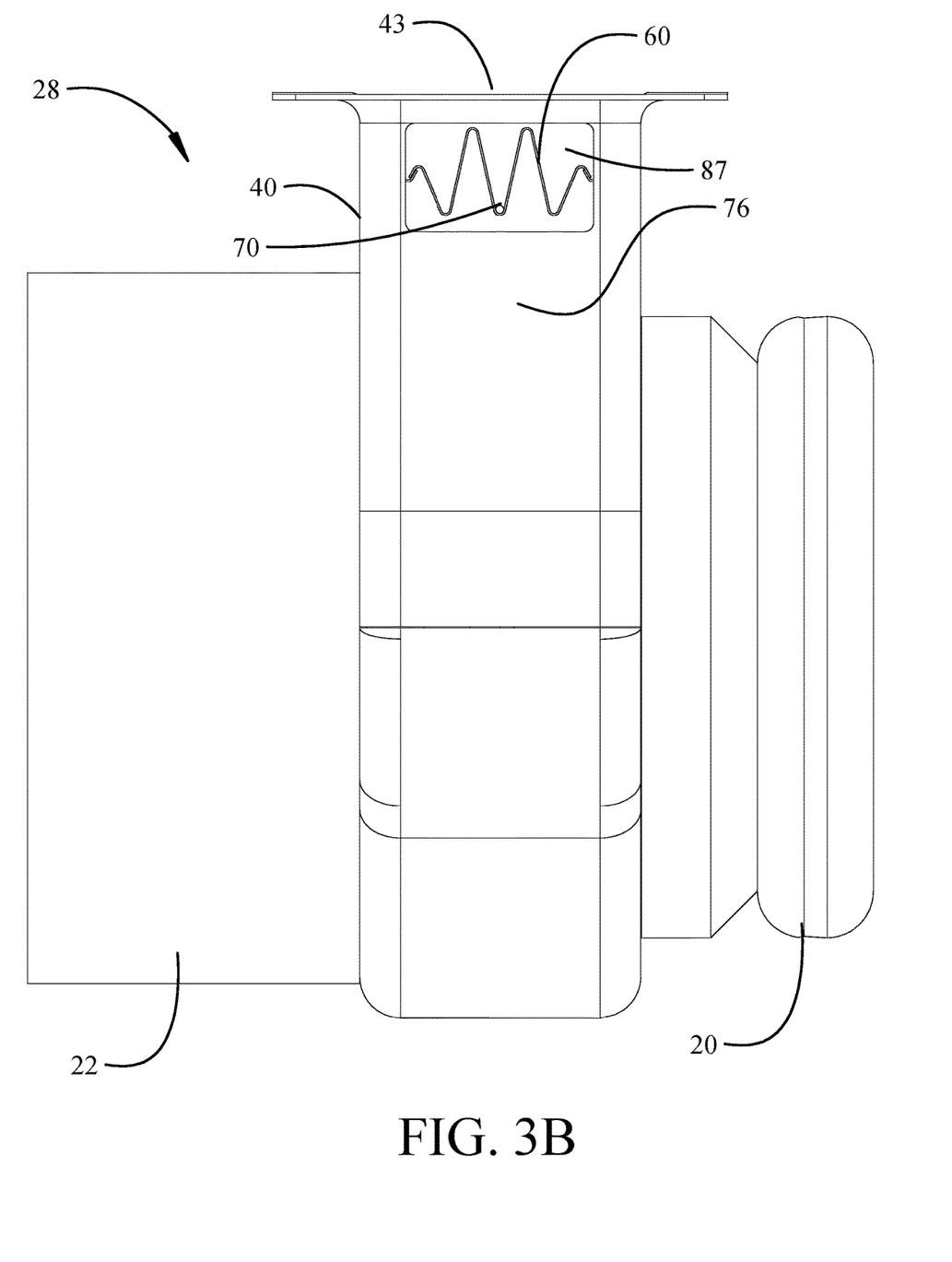
FIG. 3B is a front view of the exemplary implementation.
Figure 3C:
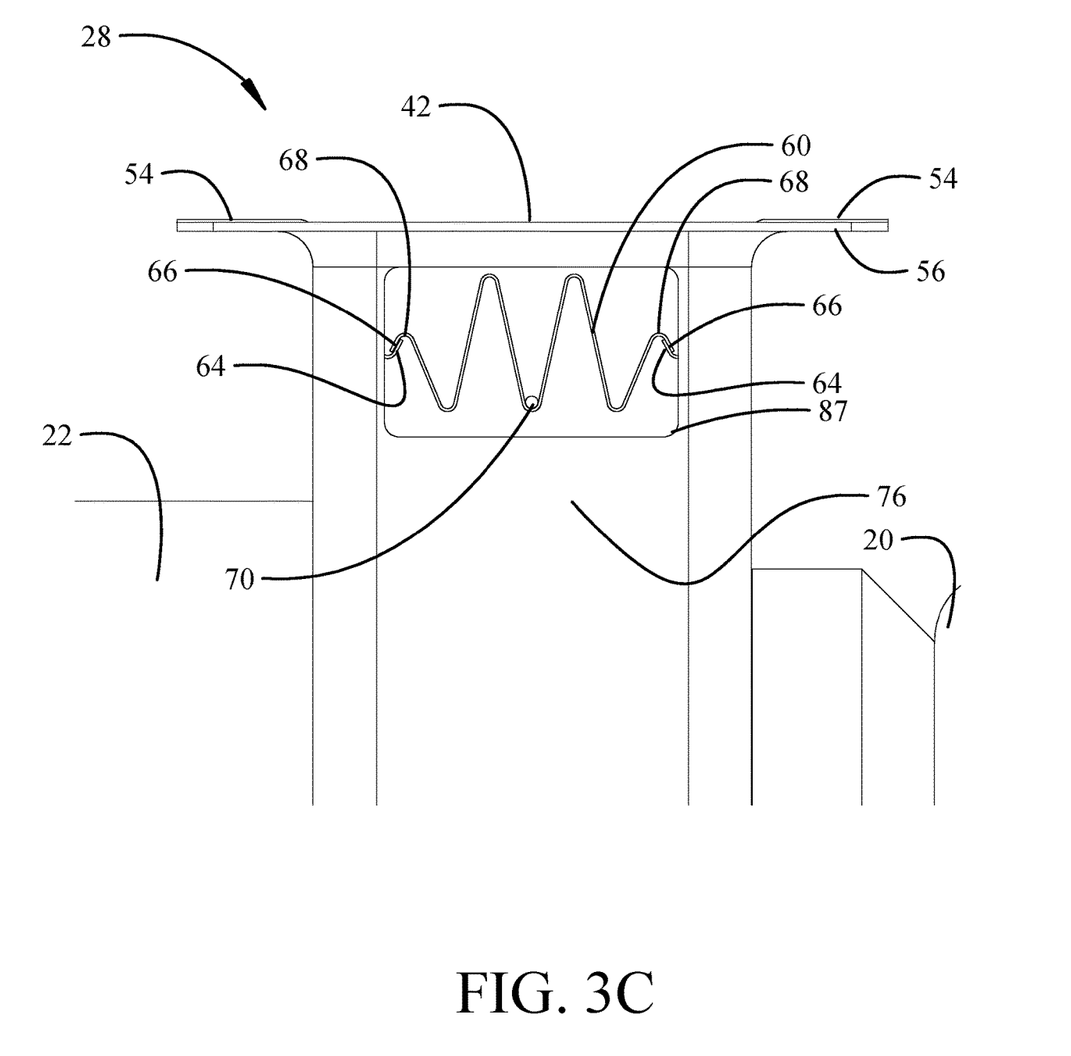
FIG. 3C is an expanded detail view of the plenum duct with the access door removed to show the pleated screen.

Referring to FIGS. 1 and 2, a tail cone 12 of an aircraft 10 is shown. A compartment 14 is disposed in the tail cone 12, the compartment 14 containing an auxiliary power unit 20. The compartment 14 is defined by a fuselage skin 16 and a aft pressure bulkhead 18 of the aircraft 10. The auxiliary power unit 20 includes a load compressor 22 and a gas turbine engine 24 coupled to and configured to drive the load compressor 22. FIG. 2 illustrates an intake duct 32 extending between an external fuselage opening 26 and a plenum duct 28 of the auxiliary power unit 20. A flow door 30 is disposed along an exterior surface 33 of the fuselage skin 16 and is pivotably attached to the exterior surface 33 of the aircraft 10 to open or close the fuselage opening 26. As seen in FIG. 2, when the flow door 30 is open, ambient air flows through the intake duct 32 and plenum duct 28 into an inlet 34 of the gas turbine engine 24, wherein the air is used in the combustion process, and an inlet 36 of the load compressor 22. An exhaust duct 38 is provided from the gas turbine engine 24 to the exterior of the tail cone 12.

As detailed in FIGS. 3A-3C and 4A-4C, the plenum duct 28 incorporates a main body 40 having an inlet aperture 42 and a flow cavity 44. For the exemplary implementation, the flow cavity 44 has a rectilinear volume 46 extending from the inlet aperture 42 and an annular volume 48 extending from the rectilinear section 46 and merging aft into flow communication the turbine inlet 34 and forward into flow communication with the load compressor inlet 36. A pair of screen supports 50 are coupled to the main body 40 proximate a periphery 52 of the inlet aperture 42. In the exemplary implementation, the screen supports 50 each include a tab 54 captured between an inlet flange 56 of the main body and a mated outlet flange 58 of the intake duct 32 (seen in FIG. 2). The tabs 54 may be frictionally constrained between the inlet flange 56 and the mated outlet flange 58 and may have holes receiving fasteners joining the inlet flange and mated outlet flange 58. Doublers, shims and seals may be employed intermediate the inlet flange 56 and mating flange 58 to further secure the screen supports 50 to the inlet flange 56 and provide a sealing surface for the mating flange 58.

Figure 4A:
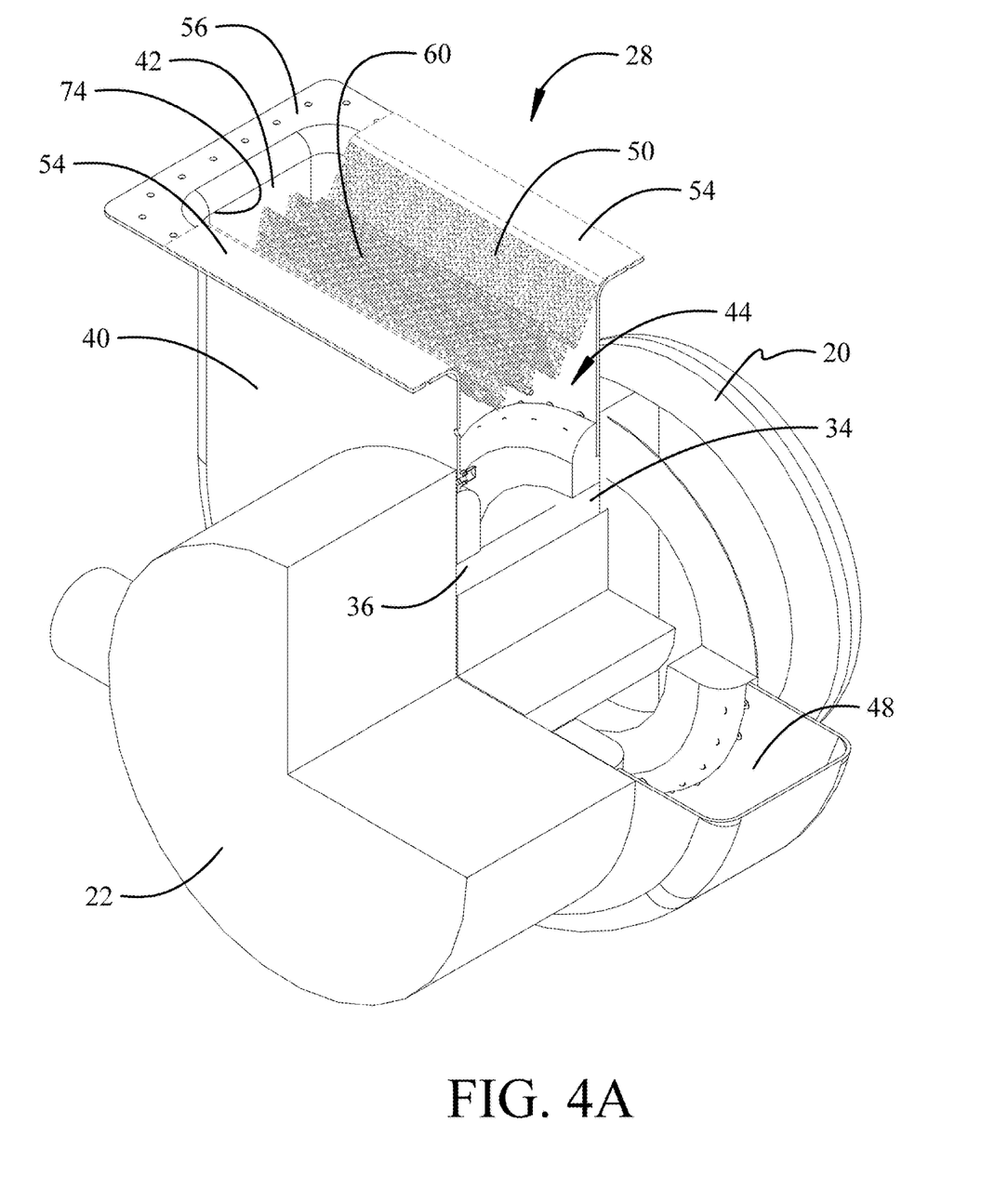
FIG. 4A is a pictorial partially sectioned representation of the plenum duct, turbine and compressor (details of the turbine and compressor are not shown)
Figure 4B:
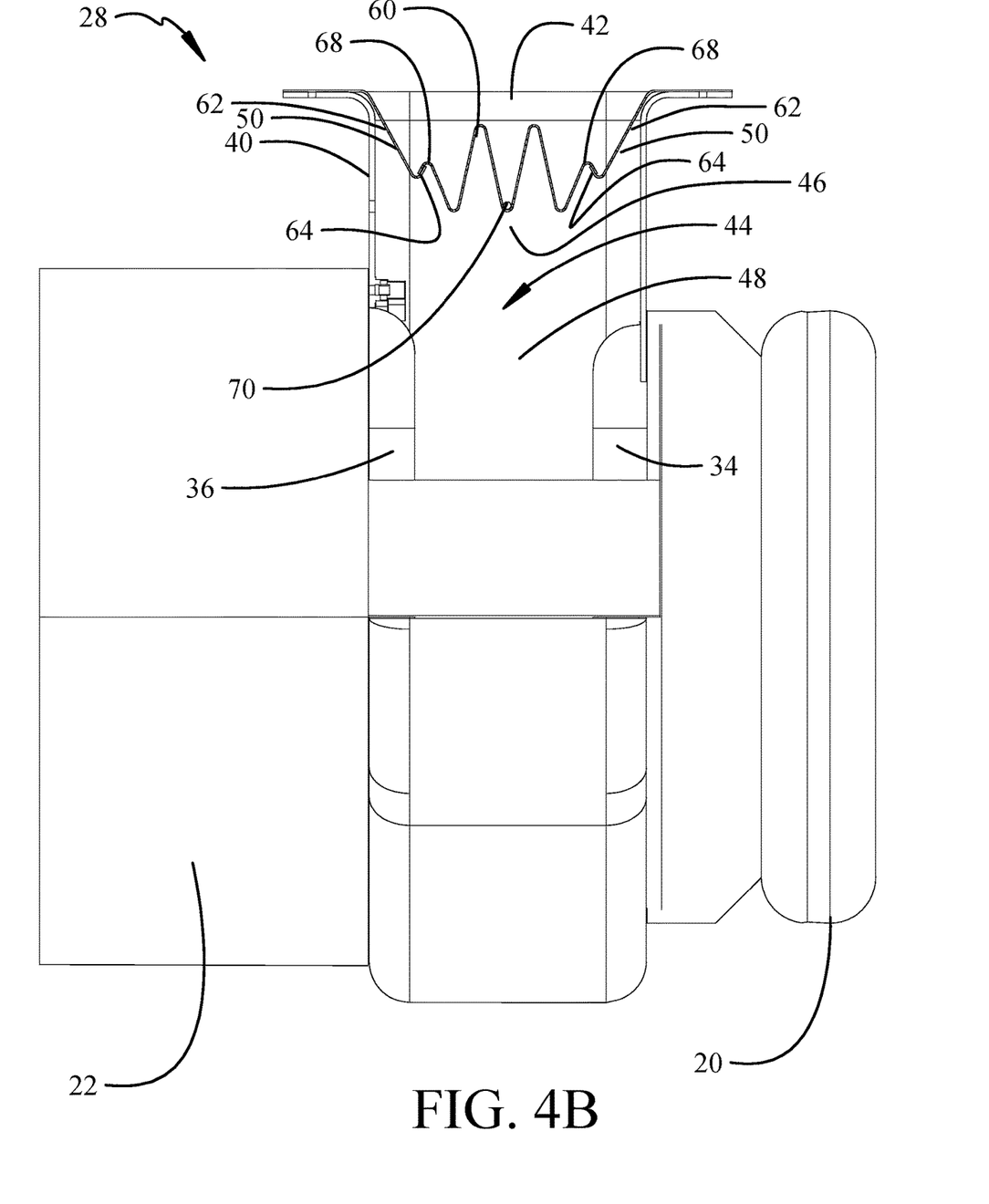
FIG. 4B is a front partial section view of the plenum duct, turbine and compressor.

The screen supports 50 extend into the flow cavity 44 and a pleated screen 60 is disposed on the pair of screen supports. A used herein the term "pleated" means a plurality of substantially planar elements folded or joined at vertices. In the implementations shown, the vertices are radiused. As best seen in FIGS. 4Ba and 4C, the screen supports 50 include attachment flanges 62 angularly extending into the rectilinear volume 46 of the flow cavity 44. For the exemplary implementation, the attachment flanges terminate in upwardly extending support hooks 64. For attachment to the screen supports 50, the pleated screen 60 terminates at lateral edges 66 in cap rails 68 configured to be received over the support hooks 64 (seen in detail in FIGS. 5A and 5B following). The pleated screen 60 is supported within the rectilinear volume 46 of the flow cavity 44 to promote better swirl recovery of the inlet airflow prior to entry into the annular volume 48 and load compressor inlet 36 with potentially better pressure distribution around load compressor inlet 36.

Figure 4C:
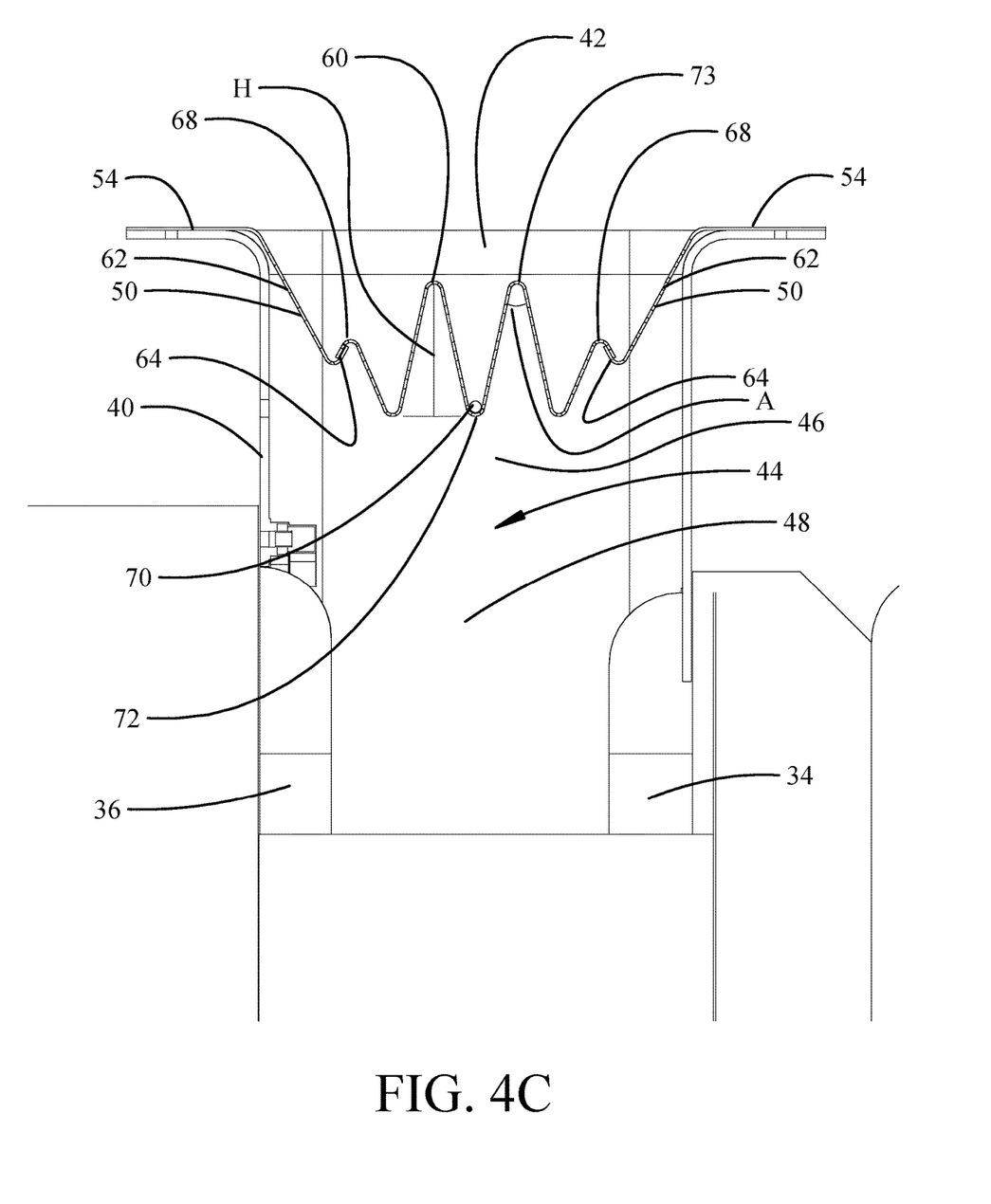
FIG. 4C is a detailed close up partial section view of the plenum duct showing details of the pleated screen, screen supports and plenum cavity.

At least one retaining rod 70 extends longitudinally in the flow cavity 44 and is received in a central longitudinal lower vertex 72 of the pleated screen 60. The retaining rod 70 maintains the cap rails 68 in engagement with the support hooks 64 preventing the pleated screen 60 from being dislodged from the screen supports 50 during operation. The retaining rod 70 extends between longitudinal walls 74, 76 of the main body 40. In alternative implementations multiple rods may be employed in upper and lower vertices in the pleated screen 60.

Figure 5A:
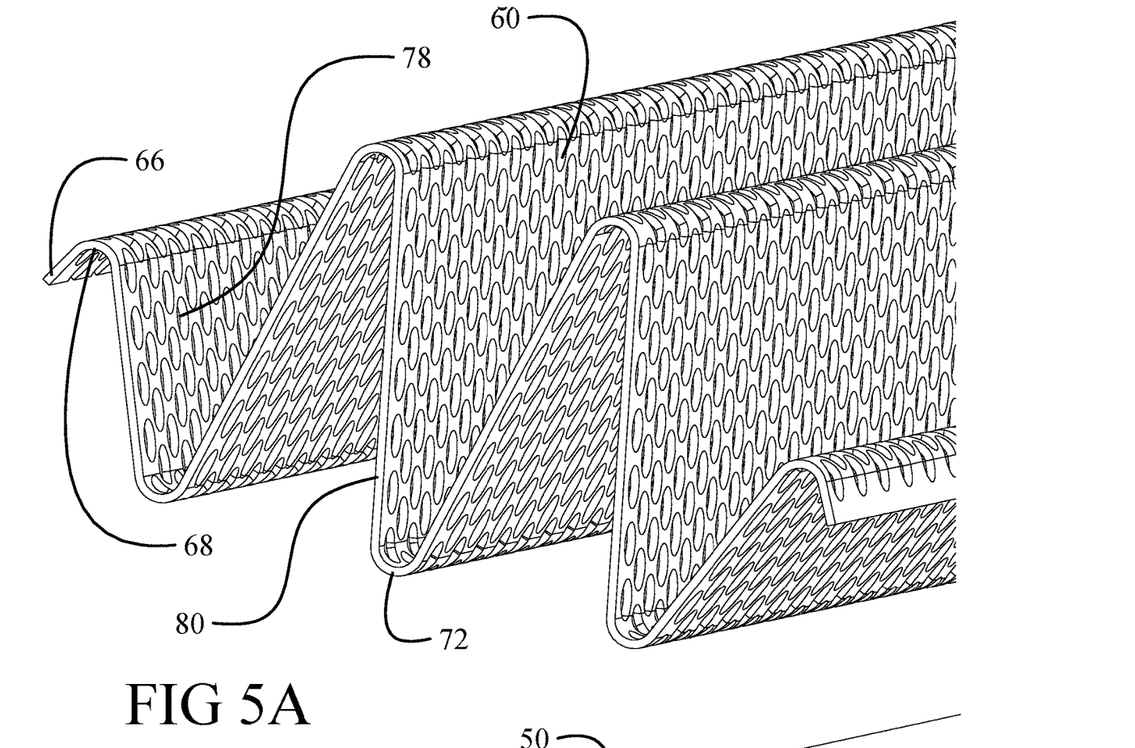
FIG. 5A is a detailed pictorial representation of the pleated screen.

As seen in detail in FIG. 5A, the pleated screen 60 includes a first array 78 of openings 78a-78n extending therethrough. The pleated screen 60 has a primary function of preventing passage of FOD into the compressor 22. Based on damage tolerance of the compressor due to compressor blade damage caused by FOD, a maximum FOD size is determined by the compressor manufacturer. A damage factor defined as a ratio of the largest dimension of the openings 78a-78n to the maximum FOD is established. Each of the openings 78a-78n in the first array 78 of openings 78a-78n is sized to maintain the damage factor at a value of less than 1. In the exemplary implementation, the maximum FOD diameter, D, is 0.250". For an exemplary implementation, the openings have a maximum dimension of 0.125 to 0.250 inches corresponding to a damage factor of 0.5 to 1.0.

In the example implementation, the pleated screen is metal with press formed openings forming the first array 78 of openings 78a-78n. The first array 78 extends to lateral extents 80 and longitudinal ends 82 (as seen in FIG. 4A) of the pleated screen 60 to maximize airflow through the pleated screen.

Figure 5B:
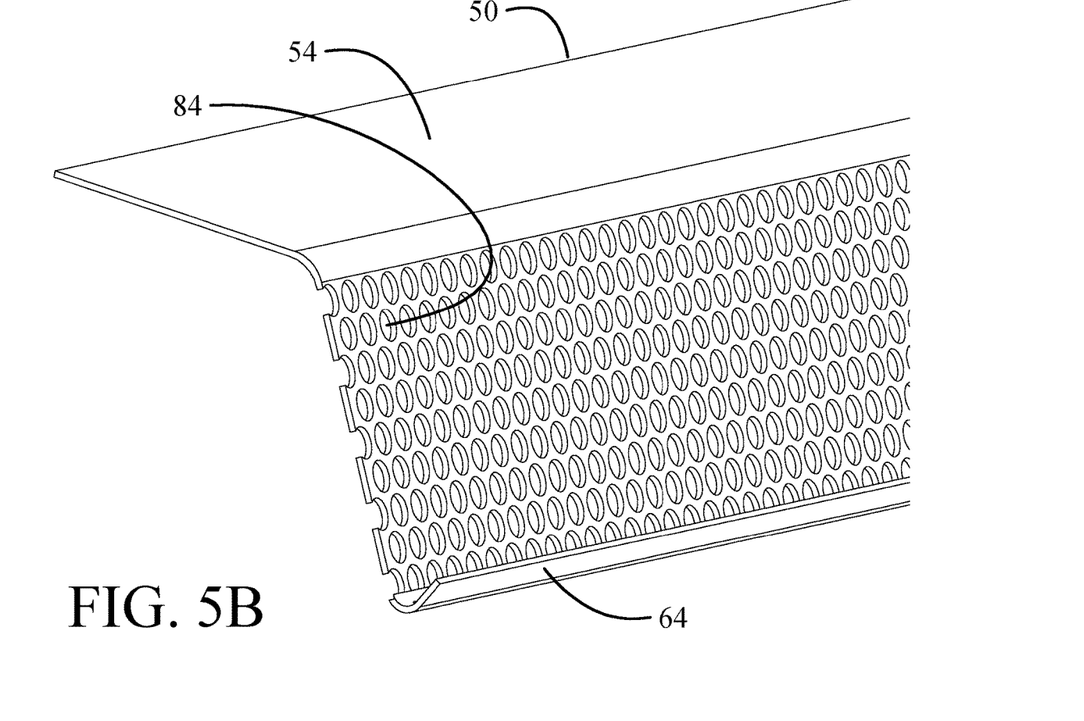
FIG. 5B is a detailed pictorial representation of the screen supports.

As seen in FIG. 5B, the attachment flanges 62 of the screen supports 50 also include a second array 84 of openings 84a-84m to provide airflow through the attachment flanges. This allows the attachment flanges 62 to angularly extend into the rectilinear volume 46 of the flow cavity 44 while minimizing impact on the airflow through the inlet into the flow cavity 44. Sizing of the openings 84a-84n in the second array 84 is again determined by the damage factor and in the example implementation each opening 84a-84m in the second array 84 has a maximum dimension not greater than any opening 78a-78n in the pleated screen 60.

While shown in the exemplary implementation as circular openings in both the pleated screen 60 and attachment flanges 62, octagonal holes, triangular holes, slotted holes, and rhomboid shapes may be employed with the configuration determined by manufacturing process. In alternative implementations, a wire mesh may be employed in the pleated screen 60 and attachment flanges 62 with a diagonal mesh dimension, corresponding to the array of openings, determined to meet the damage factor and a percentage open area of not less than 50% for desired flow performance.

A height, H, and an angle, A, of each pleat or vertex 73 (as seen in FIG. 4C) determines the tolerance to large particle FOD of the pleated screen 60 will be and how much accumulation of FOD will impact the performance of the APU. Additionally, the surface area created by the pleats, is determined to minimize the effect of FOD accumulation. The angle A is determined to minimize impact of icing accumulation and area for removal of FOD by hand, as described subsequently. The number of pleats, angle, A, and a length, L, as well as a width, W1, of the pleated screen 60 including the attachment flanges 62 (seen in FIG. 5C) are determined to minimize pressure drop through the pleated screen 60, as will be discussed in greater detail subsequently.

Figure 5C:
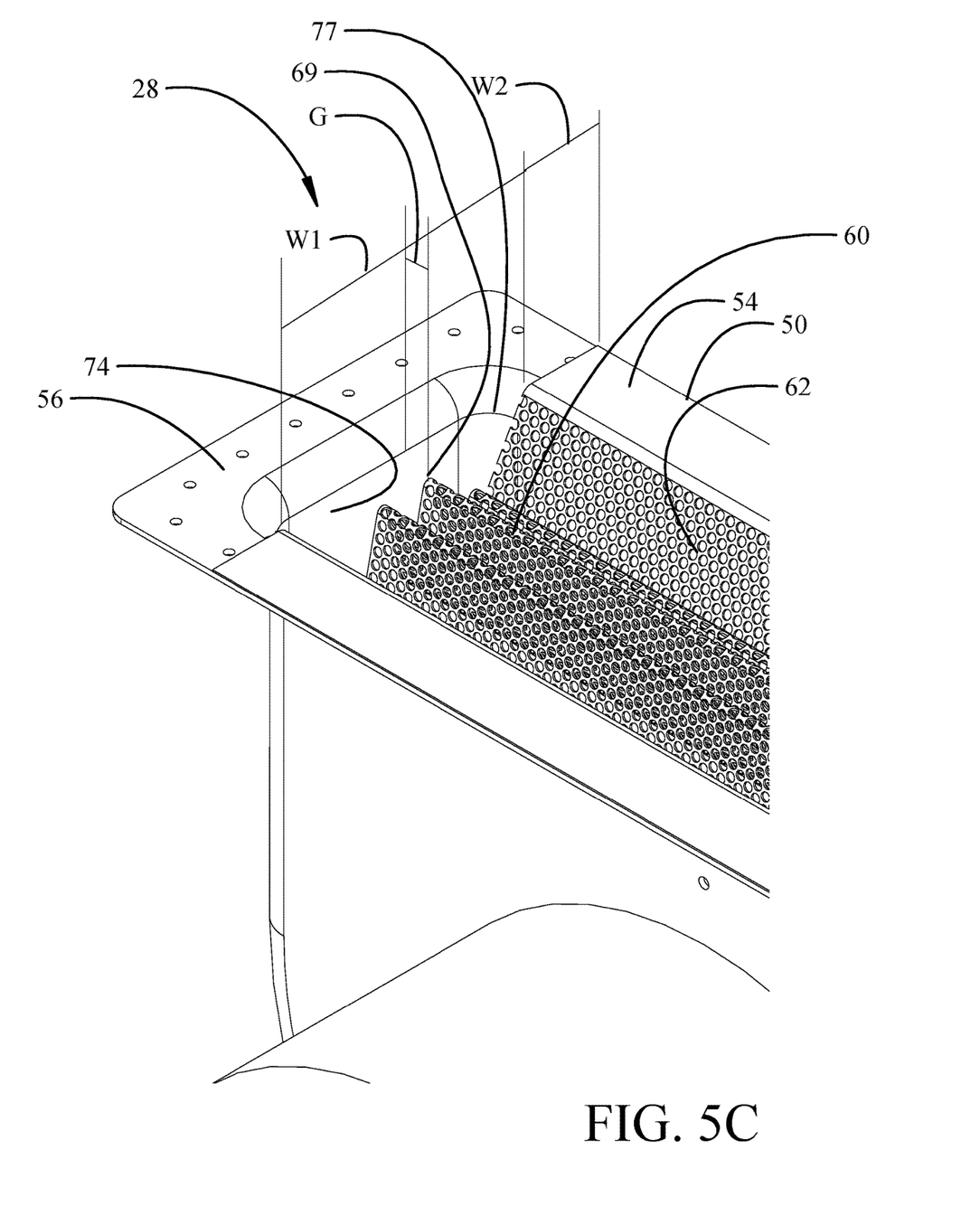
FIG. 5C is a close up detailed pictorial representation of the pleated screen and screen supports in the plenum duct.

The length, L, of the pleated screen 60 is determined to assure a gap, G, (exaggerated in the drawings for clarity), as seen in FIG. 5C, between the longitudinal ends 69, 71 and the longitudinal walls 74, 76 is not greater than the maximum dimension of the openings 78a-78b for FOD capture. A width, W2, of the screen support flanges is determined to assure clearance at any corner fillets 77 in the plenum duct 28 to allow parallel fit of the longitudinal ends 69, 71 and longitudinal walls 74, 76 within the maximum gap, G.

In an example implementation, the pleated screen 60 provides an increase of surface area in a FOD congested condition. As more FOD is collected, the additional surface area created by the pleats in the pleated screen will allow a path for airflow to continue with minimum restriction. A Surface Area Ratio (SAR) is defined as the FOD Screen Area (FSA), the flat surface area before pleating of the pleated screen 60, over the Inlet Aperture Surface Area (ISA) where ISA=L*W1. A minimum SAR is established for best performance where SAR=FSA/ISA>2.0

Additionally, a stack-up of FOD as objects fall into the bottom vertex of each pleat contributes to loss of flow performance. A minimum Pleat Height (PH) factor is determined by the FOD diameter multiplied by 5, PH>5*D. Where FOD captured by the aperture array 78 in the pleated screen 60 has a minimum value of D>0.250" as determined by the damage factor in the exemplary implementation, PH>1.250" (5*0.125"). A fixed distance between vertices in the pleated screen 60 assures equal pleat angles, A, and symmetry throughout the FOD screen. For a given inlet aperture 42 in an implementation the number of pleats is determined by satisfying the SAR. With the PH being met, a baseline of 2 pleats is increased until reaching the minimum 2:1 SAR.

Figure 6:
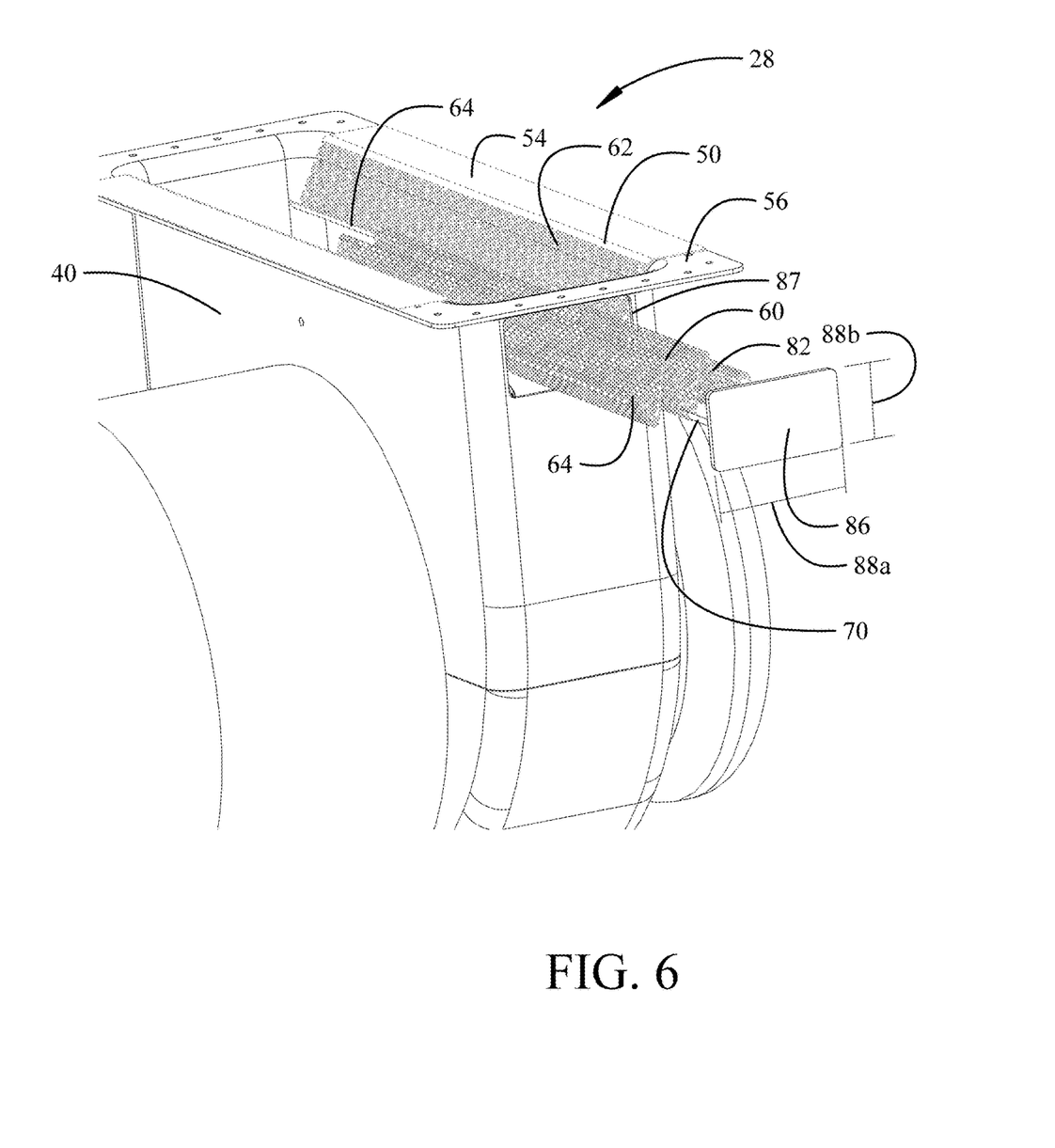
FIG. 6 is an exploded view of the plenum duct showing removal of the door for extraction or insertion of the pleated screen; and, FIG. 7 illustrates a process flow diagram illustrating a method for FOD protection employing the disclosed implementations.

The plenum duct 28 incorporates an access door 86 in at least one of the longitudinal walls 74, 76 of the main body 40 as seen in FIG. 6. The access door located adjacent to a longitudinal end 82 of the pleated screen 60. The access door 86 is sized with a width 88a and a height 88b to allow removal of the pleated screen 60 through door opening 87. The retaining rod 70 may be affixed to or extend through the door 86.

Figure 7:
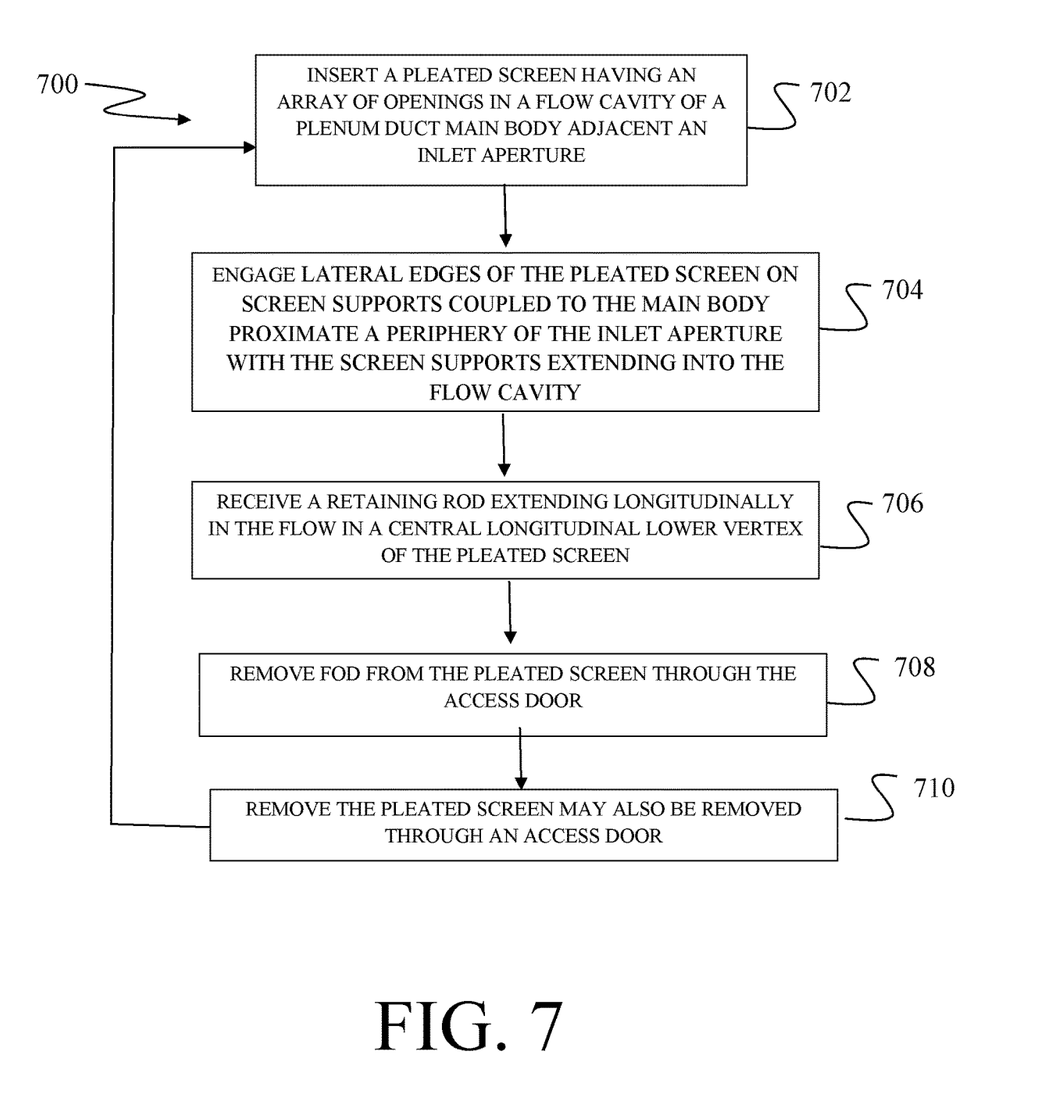

FIG. 7 demonstrates a method 700 for screening foreign objects in an auxiliary power unit employing the disclosed implementations. A pleated screen having an array of openings is inserted in a flow cavity of a plenum duct main body adjacent an inlet aperture, step 702. In an exemplary implementation, the pleated screen is received longitudinally through an access door in a lateral wall of the main body. Lateral edges of the pleated screen are engaged on screen supports coupled to the main body proximate a periphery of the inlet aperture with the screen supports extending into the flow cavity, step 704. Engaging the lateral edges is accomplished in an example implementation by engaging cap rails on the lateral edges of the pleated screen on upwardly extending support hooks which terminate angularly extending attachment flanges of the screen supports. A retaining rod extending longitudinally in the flow cavity is received in a central longitudinal lower vertex of the pleated screen, step 706. FOD is removed from the pleated screen through the access door, step 708. The pleated screen may also be removed through an access door, step 710.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. As used herein the terms "upper" and "lower", "left" and "right", "longitudinal" and "lateral", "forward" and "aft" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. A plenum duct for an auxiliary power unit, the plenum duct comprising:
   a main body having an inlet aperture and a flow cavity;
   a pair of screen supports coupled to the main body proximate a periphery of the inlet aperture, the pair of screen supports including attachment flanges angularly extending into the flow cavity; and
   a pleated screen disposed on the pair of screen supports.

2. The plenum duct of claim 1 wherein the pleated screen includes a first array of openings extending therethrough.

3. The plenum duct of claim 2 wherein each of the openings in the first array of openings are sized to prevent passage of foreign objects having a size greater than a predetermined value established by a damage factor.

4. The plenum duct of claim 3 wherein the openings each have a maximum dimension of 0.125 to 0.250 inches.

5. The plenum duct of claim 2 wherein the pleated screen is metal with press formed openings forming the first array of openings.

6. The plenum duct of claim 2 wherein the first array of openings extends to lateral and longitudinal extents of the pleated screen.

7. The plenum duct of claim 1 wherein the attachment flanges terminate in upwardly extending support hooks.

8. The plenum duct of claim 7 wherein the pleated screen terminates at lateral edges in cap rails configured to be received over the support hooks.

9. The plenum duct of claim 8 further comprising a retaining rod extending longitudinally in the flow cavity and received in a central longitudinal lower vertex of the pleated screen.

10. The plenum duct of claim 1 wherein the attachment flanges include a second array of openings.

11. The plenum duct of claim 10 wherein each opening in the second array of openings has a maximum dimension not greater than any opening in the pleated screen.

12. The plenum duct of claim 1 further comprising an access door in a wall of the main body, the access door located adjacent to a longitudinal end of the pleated screen.

13. The plenum duct of claim 12 wherein the access door is sized to allow removal of the pleated screen.

14. A method for screening foreign objects in an auxiliary power unit, the method comprising:
   inserting a pleated screen having an array of openings in a flow cavity of a main body of a plenum duct adjacent an inlet aperture and;
   engaging lateral edges of the pleated screen on a pair of screen supports coupled to the main body proximate a periphery of the inlet aperture, the pair of screen supports including attachment flanges angularly extending into the flow cavity.

15. The method as defined in claim 14 wherein the step of engaging lateral edges comprises engaging cap rails on the lateral edges of the pleated screen on upwardly extending support hooks terminating the attachment flanges on each of the pair of screen supports.

16. The method as defined in claim 15 further comprising receiving a retaining rod extending longitudinally in the flow cavity in a central longitudinal lower vertex of the pleated screen.

17. The method as defined in claim 14 wherein the step of inserting the pleated screen further comprises receiving the pleated screen longitudinally through an access door in a lateral wall of the main body.

18. The method as defined in claim 14 further comprising removing the pleated screen through an access door in a lateral wall of the main body.

19. An Auxiliary Power Unit comprising:
   a load compressor with a first inlet;
   a turbine engine with a second inlet;
   a plenum housing having a main body having an inlet aperture and a flow cavity the first and second inlets in flow communication with the flow cavity;
   a pair of screen supports coupled to the main body proximate a periphery of the inlet aperture, the pair of screen supports extending into the flow cavity; and
   a pleated screen disposed on the pair of screen supports.

20. A plenum duct for an auxiliary power unit, the plenum duct comprising:
   a main body having an inlet aperture and a flow cavity;
   a pair of screen supports coupled to the main body proximate a periphery of the inlet aperture, the pair of screen supports including attachment flanges angularly extending into the flow cavity wherein the attachment flanges terminate in upwardly extending support hooks;
   a pleated screen terminating at lateral edges in cap rails configured to be received over the support hooks disposed on the pair of screen supports, the pleated screen including a first array of openings extending therethrough wherein each of the openings in the first array of openings are sized to prevent passage of foreign objects having a size greater than a predetermined value established by a damage factor, and wherein the attachment flanges include a second array of openings, each opening in the second array of openings having a maximum dimension not greater than any opening in the pleated screen;

a retaining rod extending longitudinally in the flow cavity and received in a central longitudinal lower vertex of the pleated screen; and an access door in a wall of the main body, the access door located adjacent to a longitudinal end of the pleated screen, the access door sized to allow removal of the pleated screen.

\* \* \* \* \*